United States Patent
Hellmann

(10) Patent No.: US 7,257,921 B1
(45) Date of Patent: Aug. 21, 2007

(54) DUCK DECOY ANCHOR

(76) Inventor: Paul F. Hellmann, 11340 Pont Rd., Albion, PA (US) 16401

( * ) Notice: Subject to any disclaimer, the term of this patent is extended or adjusted under 35 U.S.C. 154(b) by 0 days.

(21) Appl. No.: 11/448,304

(22) Filed: Jun. 7, 2006

(51) Int. Cl.
A01M 31/06 (2006.01)
B63B 21/24 (2006.01)
B63B 21/26 (2006.01)

(52) U.S. Cl. .................... 43/3; 43/42.47; 43/44.96; 114/294; 114/301

(58) Field of Classification Search ............ 43/3, 43/2, 42.47, 44.96, 42.39; 114/294, 295, 114/300, 301
See application file for complete search history.

(56) References Cited

U.S. PATENT DOCUMENTS

| | | | | |
|---|---|---|---|---|
| 261,334 A * | 7/1882 | Goldsmith | .................. | 114/300 |
| 368,427 A * | 8/1887 | Ryan | ................... | 43/3 |
| 631,168 A * | 8/1899 | Langston | ................... | 43/3 |
| 775,580 A * | 11/1904 | Riggs | ................... | 43/3 |
| 814,097 A * | 3/1906 | Tartsch | ................... | 43/3 |
| 959,764 A * | 5/1910 | Lenz | ................... | 114/294 |
| 1,057,600 A * | 4/1913 | Warner | ................... | 114/301 |
| 1,370,145 A * | 3/1921 | Moore | ................... | 43/3 |
| 1,429,558 A * | 9/1922 | Bauer | ................... | 43/3 |
| 1,468,780 A * | 9/1923 | Fraser | ................... | 43/3 |
| 1,486,329 A * | 3/1924 | George | ................... | 43/3 |
| 1,565,474 A * | 12/1925 | Link | ................... | 43/3 |
| 1,663,080 A * | 3/1928 | Heddon | ................... | 43/42.39 |
| 1,736,403 A * | 11/1929 | Heddon | ................... | 43/42.39 |
| 1,857,939 A * | 5/1932 | Cameron | ................... | 43/42.39 |
| 1,858,347 A * | 5/1932 | Swift | ................... | 43/44.96 |
| 1,902,393 A * | 3/1933 | Bosch | ................... | 43/3 |
| 1,962,188 A * | 6/1934 | Freeman | ................... | 43/3 |
| 1,967,902 A * | 7/1934 | Waldo | ................... | 43/3 |
| 1,997,900 A * | 4/1935 | Waldo | ................... | 43/42.47 |
| 2,005,554 A * | 6/1935 | Milner | ................... | 43/42.47 |
| 2,023,526 A * | 12/1935 | Hoberg | ................... | 43/3 |
| 2,245,267 A * | 6/1941 | Elfstrand | ................... | 43/3 |
| 2,250,038 A * | 7/1941 | Sink | ................... | 43/44.96 |
| 2,256,768 A * | 9/1941 | Taylor | ................... | 43/44.96 |
| 2,268,963 A * | 1/1942 | Riddell | ................... | 43/3 |
| 2,278,594 A * | 4/1942 | Smith | ................... | 43/3 |
| 2,289,647 A * | 7/1942 | Grossenbach | ................... | 43/3 |
| 2,413,418 A * | 12/1946 | Rulison | ................... | 43/3 |
| 2,430,645 A * | 11/1947 | Mills et al. | ................... | 43/3 |
| 2,520,233 A * | 8/1950 | Buehl | ................... | 43/3 |
| 2,523,811 A * | 9/1950 | Buehl | ................... | 43/3 |
| 2,555,815 A * | 6/1951 | Rawlins et al. | ................... | 43/3 |
| 2,589,913 A * | 3/1952 | Wenner | ................... | 43/3 |
| 2,595,966 A * | 5/1952 | Majors | ................... | 43/3 |
| 2,608,361 A * | 8/1952 | Huebner | ................... | 43/3 |

(Continued)

FOREIGN PATENT DOCUMENTS

FR 2365475 A * 5/1978

(Continued)

Primary Examiner—Darren W. Ark
(74) Attorney, Agent, or Firm—Richard K Thomson

(57) ABSTRACT

A banana shaped weight has a connecting eyelet on a forward end of a top side to which a line is attached to the decoy and a wider tongue member extending from a bottom side beneath the connecting eyelet. A reinforcing rib reacts any forces the tongue member may experience as it digs into the soil beneath the water into the central portion of the body of the weight to resist possible bending or breakage of the tongue.

3 Claims, 2 Drawing Sheets

U.S. PATENT DOCUMENTS

| | | | | |
|---|---|---|---|---|
| 2,610,428 A * | 9/1952 | Jones | | 43/42.39 |
| 2,630,093 A * | 3/1953 | Toal | | 43/3 |
| 2,632,973 A * | 3/1953 | Pulver | | 43/42.47 |
| 2,644,266 A * | 7/1953 | Updegrove | | 43/44.96 |
| 2,678,778 A * | 5/1954 | Gibson | | 43/3 |
| 2,695,587 A * | 11/1954 | Welter | | 43/44.96 |
| 2,700,240 A * | 1/1955 | Gibbs | | 43/42.4 |
| 2,709,866 A * | 6/1955 | Stumvoll et al. | | 43/3 |
| 2,711,607 A * | 6/1955 | Watson | | 43/3 |
| 2,747,315 A * | 5/1956 | Clemas | | 43/3 |
| 2,801,490 A * | 8/1957 | Daves | | 43/42.39 |
| 2,813,363 A * | 11/1957 | Leckner | | 43/3 |
| 2,813,367 A * | 11/1957 | Jackson | | 43/44.96 |
| 3,050,895 A * | 8/1962 | Bratland et al. | | 43/3 |
| 3,076,283 A * | 2/1963 | Luketa | | 114/294 |
| 3,115,721 A * | 12/1963 | Story | | 43/3 |
| 3,187,457 A * | 6/1965 | Karisch | | 43/42.47 |
| 3,204,364 A * | 9/1965 | Beers | | 43/44.96 |
| 3,254,439 A * | 6/1966 | Hansen | | 43/3 |
| 3,470,841 A * | 10/1969 | Luque | | 114/300 |
| 3,492,751 A * | 2/1970 | McInnes et al. | | 43/3 |
| 3,702,035 A * | 11/1972 | Pope | | 43/42.47 |
| 3,754,524 A * | 8/1973 | Locks | | 114/294 |
| 3,798,820 A * | 3/1974 | Dye | | 43/3 |
| 3,930,328 A * | 1/1976 | Knuth | | 43/3 |
| D244,772 S * | 6/1977 | Zongker | | D12/215 |
| 4,056,890 A * | 11/1977 | Dembski | | 43/3 |
| 4,120,110 A * | 10/1978 | Aeschliman | | 43/3 |
| 4,245,421 A * | 1/1981 | Phillips | | 43/42.47 |
| D259,035 S * | 4/1981 | Greenhawk, Sr. | | D12/215 |
| 4,656,771 A * | 4/1987 | Holmes | | 43/3 |
| 4,660,318 A * | 4/1987 | Mieno | | 43/42.39 |
| 4,674,219 A * | 6/1987 | Chargo et al. | | 43/3 |
| 4,739,576 A * | 4/1988 | Davis | | 43/42.47 |
| 4,807,388 A * | 2/1989 | Cribb | | 43/42.47 |
| 4,815,229 A * | 3/1989 | Nicholson, III | | 43/42.47 |
| 4,862,629 A * | 9/1989 | Ryan | | 43/42.39 |
| 5,077,931 A * | 1/1992 | Marshall | | 43/42.52 |
| 5,101,592 A * | 4/1992 | Merritt | | 43/44.96 |
| 5,168,650 A * | 12/1992 | Martin | | 43/3 |
| 5,216,830 A * | 6/1993 | Brott, II | | 43/42.39 |
| 5,301,453 A * | 4/1994 | Terrill | | 43/42.09 |
| 5,342,229 A * | 8/1994 | Whitt | | 114/294 |
| 5,461,816 A * | 10/1995 | Gazalski | | 43/3 |
| 5,600,916 A * | 2/1997 | Smith | | 43/42.47 |
| 5,822,907 A * | 10/1998 | Lukey | | 43/3 |
| 5,893,230 A * | 4/1999 | Koltoniak | | 43/3 |
| 5,974,720 A * | 11/1999 | Bowling | | 43/3 |
| 6,357,161 B1 * | 3/2002 | Best | | 43/3 |
| 6,374,535 B1 * | 4/2002 | Bailey | | 43/42.47 |
| 6,543,176 B1 * | 4/2003 | McGhghy | | 43/3 |
| 6,578,313 B1 * | 6/2003 | Knol | | 43/42.47 |
| 6,647,657 B2 * | 11/2003 | Igo | | 43/3 |
| 6,857,216 B1 * | 2/2005 | Merin | | 43/3 |
| 7,107,720 B2 * | 9/2006 | Burggrabe et al. | | 43/42.47 |
| 7,117,628 B1 * | 10/2006 | Bailey | | 43/3 |
| 7,140,147 B2 * | 11/2006 | Wacha | | 43/42.47 |
| 2004/0163300 A1 * | 8/2004 | Pinkston | | 43/3 |
| 2005/0016053 A1 * | 1/2005 | Hulley et al. | | 43/3 |
| 2005/0246940 A1 * | 11/2005 | Jones et al. | | 43/42.39 |
| 2006/0162228 A1 * | 7/2006 | Sieman | | 43/3 |
| 2006/0242883 A1 * | 11/2006 | Tilby | | 43/3 |
| 2006/0265936 A1 * | 11/2006 | Wilkinson | | 43/42.47 |

FOREIGN PATENT DOCUMENTS

| | | | |
|---|---|---|---|
| GB | 1356259 A * | 6/1974 | |
| GB | 1390780 A * | 4/1975 | |
| GB | 2391442 A * | 2/2004 | |
| JP | 10-178997 A * | 7/1998 | |
| JP | 11-225637 A * | 8/1999 | |
| JP | 11-235142 A * | 8/1999 | |
| JP | 11-289939 A * | 10/1999 | |
| JP | 2004-290096 A * | 10/2001 | |
| JP | 3625213 A * | 12/2004 | |
| WO | WO-87-03260 A * | 6/1987 | |

\* cited by examiner

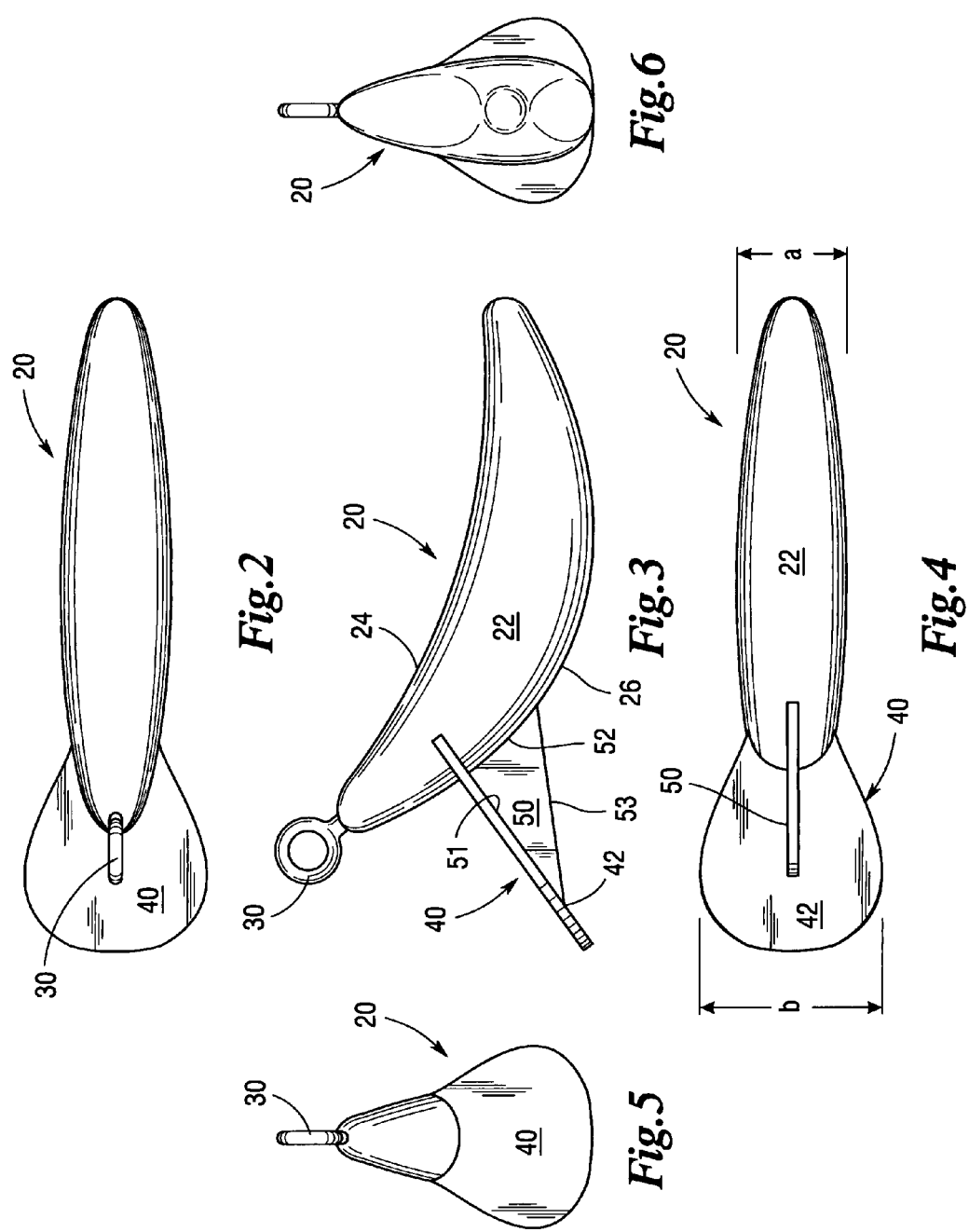

DUCK DECOY ANCHOR

BACKGROUND AND SUMMARY OF THE INVENTION

The present invention is directed to the field of hunting. More particularly, the present invention is directed to a duck decoy anchor for securing a floating decoy to a desired area.

Duck decoys are widely used as one means, typically used in conjunction with a call, to attract ducks on the wing to the vicinity of a duck blind or other camouflaged hunter hangout. Frequently, weather conditions involve wind which can propel the decoys across the body of water to places displaced from the duck blind. The decoys then, become counterproductive, actually luring the quarry away from the hunter. Current day anchors for preventing such decoy migration are ineffective at accomplishing the desired result. It is therefore, an object of the present invention to provide a duck decoy anchor which effectively anchors itself in the sand and, therefore, limits the duck decoy to travel within a confined area as limited by the length of the tethering length of fishing line.

The duck decoy of the present invention comprises a generally banana shaped weight; a connecting loop affixed to a first forward end of the banana shaped weight on a top side thereof, the connecting loop being attached to the duck decoy by an interconnected length of fishing line; a downwardly projecting tongue member attached to the forward portion to a bottom side thereof beneath the connecting loop, the downwardly projecting tongue digging into a sandy bottom of the body of water to ensure that the decoy moves about the anchor within the particular area as tethered by the interconnected length of fishing line.

The duck decoy anchor preferably has a reinforcing rib extending between a rear portion of the tongue member and a mid-portion of the banana shaped weight to transfer any load experienced by the tongue member into the mid-portion of the banana shaped weight. The banana shaped weight has a first maximum lateral dimension and the tongue member has a second maximum lateral dimension which exceeds the first lateral dimension, most preferably by a factor of 1.5 to 1.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which

FIG. 2 is a top view of the first embodiment;

FIG. 3 is a side view of the first embodiment;

FIG. 4 is a bottom view of the first embodiment;

FIG. 5 is a front view of the first embodiment; and,

FIG. 6 is a rear view of the first embodiment.

DETAILED DESCRIPTION OF PREFERRED EMBODIMENT(S)

Figure 1:
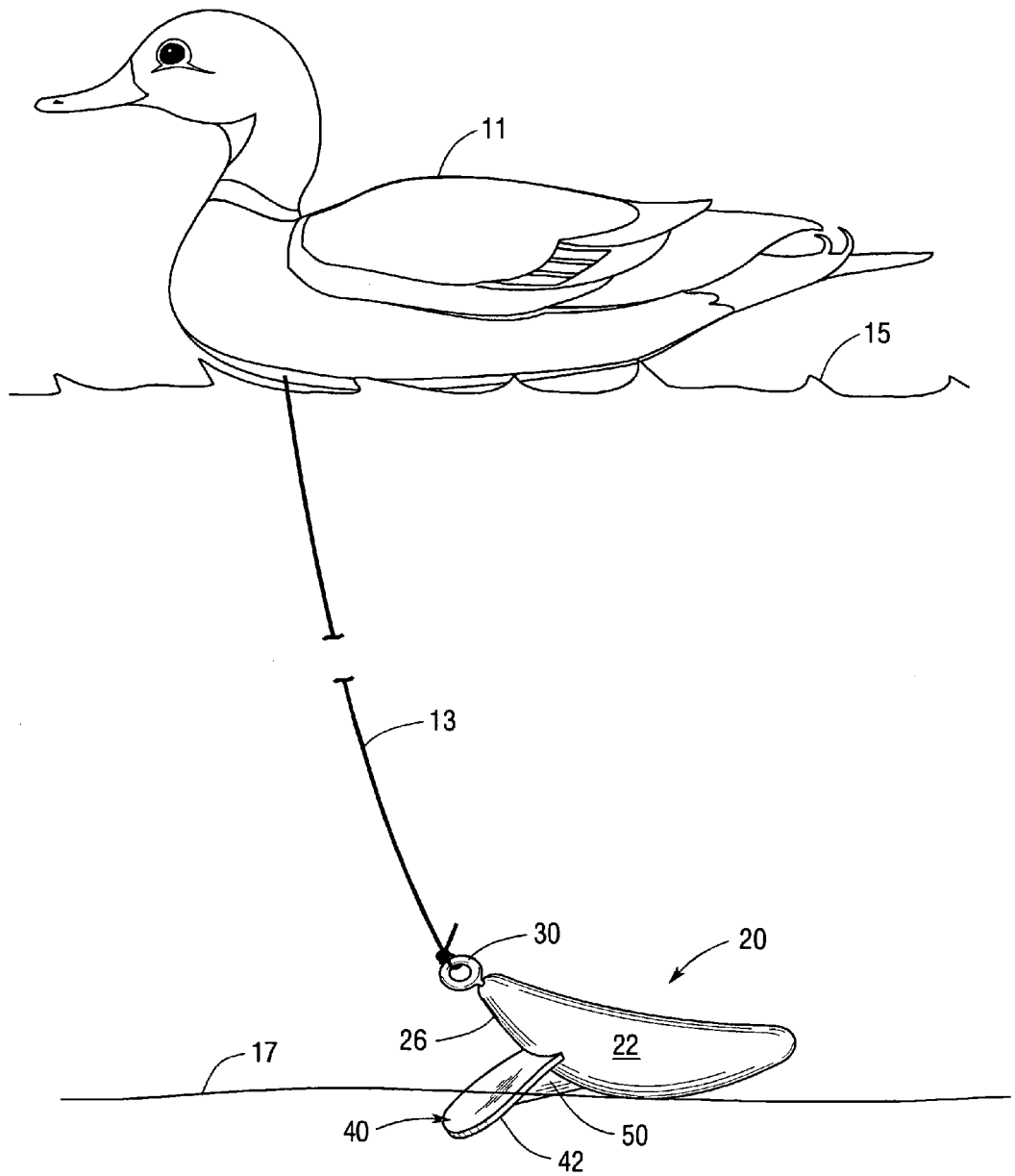
FIG. 1 is a perspective side view of a first embodiment of the duck decoy anchor of the present invention shown in use with a duck decoy.

A first embodiment of the duck decoy anchor of the present invention is depicted in FIGS. 1-6 generally at 20. The duck decoy anchor of the present invention comprises a generally banana shaped weight 22. By way of example and not limitation, banana shaped weight 22 may comprise 5 oz of lead. Banana shaped weight 22 has a connecting eyelet or loop 30 attached to a first forward end of the top side 24 of weight 22. A line, typically in the form of a length of fishing line 13, interconnects duck decoy anchor 20 via loop 30 to duck decoy 11. Fishing line 13 may have whatever length appropriate for the depth of the body of water 15 upon which decoy 11 is to be used.

Tongue member 40 is attached to and protrudes from a lower side 26 of weight 22 generally beneath loop 24. Tongue member 40 extends downwardly and forwardly from lower side 26 in such a manner as to be able to dig into sand 17 beneath water 15. Reinforcing rib 50 extends from the back side 42 of tongue member 40 into a more central portion 28 of lower side 26. In this manner, any forces incurred by tongue member 40 will be reacted rearwardly into the body of weight 22, rather than creating a torque which could snap tongue member 40 off weight 22. The reinforcing rib 50 defining three edges 51-53 about a perimeter thereof. A first edge 51 extending along and in contact with the rear portion of the tongue member 40 along the entire length of the first edge 51. A second edge 52 extending along and in contact with the lower side 26 of the banana shaped weight 22 along the entire length of the second edge 52. A third edge 53 being straight and extending between lowermost ends of the first 51 and second 52 edges which are furthest from the banana shaped weight. While the body of weight 22 has a maximum width 'a', tongue member 40 has a maximum width 'b' which is at least 1.5 times 'a' and more preferably, 1.6 times the maximum width of weight 22 (FIG. 3).

When anchor 20 of the present invention is used, as the wind blows duck decoy 11 about the surface of water 15, tongue member 40 will dig into the soil 17 (FIG. 1) and secure anchor 20 in place. Decoy 11 will, then, be confined to a restricted space mapped out by the tether created by fishing line 13, since the anchor 20 will be secured in place by tongue 40 digging into sand 17.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A duck decoy anchor for securing a position of a duck decoy to a particular area on a body of water, said duck decoy anchor comprising:
   a) a generally banana shaped weight having
      i) a first forward end, a second rear end, and a forward portion which curves upwardly in its operative position toward said first forward end, and
      ii) sufficient mass to settle to a bottom of the body of water;
   b) a connecting loop affixed to said first forward end of said banana shaped weight, said connecting loop being attachable to the duck decoy by an interconnected length of fishing line;
   c) a downwardly projecting tongue member attached to said forward portion of said banana shaped weight at a bottom side thereof beneath said connecting loop, said downwardly projecting tongue member and said forward portion which curves upwardly diverging from each other so as to form an angle therebetween, and said downwardly projecting tongue member having a flat surface functioning to dig into a sandy bottom of the body of water to ensure that the decoy moves about said anchor within the particular area as tethered by the interconnected length of fishing line; and d) a reinforcing rib extending between a rear portion of said tongue member and a mid-portion of said banana shaped weight to transfer any load experienced by said tongue member into said mid-portion of said banana shaped weight, said rib being generally flat and extending in a plane parallel to a longitudinal axis of said banana shaped weight, said rib defining three edges about a perimeter thereof, a first edge of said three edges extending along and in contact with said rear portion of said tongue member along an entire length of said first edge, a second edge of said three edges extending along and in contact with said bottom side of said banana shaped weight along an entire length of said second edge, and a third edge of said three edges being straight and extending between lowermost ends of said first edge and said second edge which are furthest from said banana shaped weight.

2. The duck decoy anchor of claim 1 wherein said banana shaped weight has a first maximum lateral dimension and said tongue member has a second maximum lateral dimension which exceeds said first lateral dimension.

3. The duck decoy anchor of claim 2 wherein said second maximum lateral dimension is generally 1½ times that of said first maximum lateral dimension.

* * * * *